United States Patent
Orivuori et al.

(10) Patent No.: US 11,169,525 B2
(45) Date of Patent: Nov. 9, 2021

(54) CONTROLLING MARINE VESSEL

(71) Applicant: ABB Schweiz AG, Baden (CH)

(72) Inventors: Juha Orivuori, Helsinki (FI); Kalevi Tervo, Helsinki (FI); Andrei Korsström, Helsinki (FI)

(*) Notice: Subject to any disclaimer, the term of this patent is extended or adjusted under 35 U.S.C. 154(b) by 35 days.

(21) Appl. No.: 16/710,690

(22) Filed: Dec. 11, 2019

(65) Prior Publication Data
US 2020/0115012 A1    Apr. 16, 2020

Related U.S. Application Data

(63) Continuation of application No. PCT/EP2017/064694, filed on Jun. 15, 2017.

(51) Int. Cl.

| | |
|---|---|
| *G05D 1/02* | (2020.01) |
| *B63B 39/08* | (2006.01) |
| *B63H 20/00* | (2006.01) |
| *B63H 25/38* | (2006.01) |
| *B63B 79/15* | (2020.01) |
| *B63B 79/20* | (2020.01) |

(52) U.S. Cl.
CPC .......... *G05D 1/0208* (2013.01); *B63B 39/08* (2013.01); *B63B 79/15* (2020.01); *B63H 21/265* (2013.01); *B63H 25/38* (2013.01); *B63B 79/20* (2020.01)

(58) Field of Classification Search
CPC ...... G05D 1/0208; B63B 79/15; B63B 79/20; B63B 39/08; B63H 21/265; B63H 25/38
See application file for complete search history.

(56) References Cited

U.S. PATENT DOCUMENTS

| 1,731,236 | A | * | 10/1929 | Dow | B63B 39/00 114/122 |
| 1,774,825 | A | * | 9/1930 | Dow | B63B 39/00 114/122 |
| 6,978,728 | B2 | * | 12/2005 | Koop | B63B 39/06 114/122 |
| 9,145,191 | B2 | * | 9/2015 | Lofgren | B63B 39/00 |
| 9,547,308 | B2 | * | 1/2017 | Merchant | B63H 25/04 |

(Continued)

FOREIGN PATENT DOCUMENTS

| EP | 2563650 B1 | 8/2014 |
| WO | 2012080241 A1 | 6/2012 |

(Continued)

OTHER PUBLICATIONS

European Patent Office, International Search Report & Written Opinion issued in corresponding Application No. PCT/EP2017/064694, dated Apr. 26, 2018, 17 pp.

(Continued)

*Primary Examiner* — S. Joseph Morano
*Assistant Examiner* — Jovon E Hayes
(74) *Attorney, Agent, or Firm* — Leydig, Voit & Mayer, Ltd.

(57) ABSTRACT

Controlling marine vessel: obtaining motion data related to the marine vessel; obtaining an operation state related to one or more apparatuses exerting force from the marine vessel to ambient water; detecting a disturbance in one or more degrees of freedom affecting the marine vessel based on the motion data; and determining control data for the one or more apparatuses exerting force to attenuate the detected disturbance.

18 Claims, 4 Drawing Sheets

(56) References Cited

U.S. PATENT DOCUMENTS

| | | | |
|---|---|---|---|
| 2015/0032306 A1* | 1/2015 | Mathiesen | B63H 25/42 |
| | | | 701/21 |
| 2020/0115012 A1* | 4/2020 | Orivuori | B63H 25/42 |

FOREIGN PATENT DOCUMENTS

| | | | | |
|---|---|---|---|---|
| WO | WO-2012080241 A1 * | 6/2012 | | B63H 25/42 |
| WO | 2013139609 A1 | 9/2013 | | |

OTHER PUBLICATIONS

Fossen et al., "A Survey of Control Allocation Methods for Ships and Underwater Vehicles," IEEE 14th Mediterranean Conference on Control and Automation, Jun. 1, 2006, pp. 6 pp.

Smogeli et al., "Experimental Validation of Power and Torque Thruster Control," Proceedings of the 13th Mediterranean Conference on Control and Automation, Limassol, Cyprus, Jun. 27-29, 2005, pp. 1506-1511.

"Azipull Carbon—AZP C65 steerable pulling thruster for yachts," Fact Sheet, Rolls-Royce, Retrieved from the Internet: https://www.rolls-royce.com//media/Filies/R/Rolls-Royce/documents/marine-product-finder/rr-azipull-carbon-fs-2016.pdf.

* cited by examiner

FIG. 1

200 FRONT: ROLL

202 PROFILE: PITCH

204 TOP: YAW

206 PROFILE: SURGE

208 TOP: SWAY

210 FRONT: HEAVE

CONTROLLING MARINE VESSEL

FIELD

The invention relates to a computer-implemented method for controlling a marine vessel, a controller for one or more apparatuses exerting force from the marine vessel to ambient water, a computer-readable medium comprising computer program code for the controller, and the marine vessel comprising the controller.

BACKGROUND

Disturbances (such as periodic disturbances due to waves, for example) have a serious impact on a performance and fuel consumption of a marine vessel. Various patents such as U.S. Pat. Nos. 1,731,236, 1,774,825, 9,145,191 and EP 2563650 relate to solving this problem. WO 2012/080241 A1 discloses thrust allocation in dynamic positioning (DP) systems.

As sustainable development becomes more important, further sophistication in development and operation of marine vessels is desirable.

BRIEF DESCRIPTION

The present invention seeks to provide an improved control for a marine vessel.

According to an aspect of the present invention, there is provided a computer-implemented method for controlling a marine vessel as specified in claim 1.

According to another aspect of the present invention, there is provided a controller for one or more apparatuses exerting force from a marine vessel to ambient water as specified in claim 16.

According to another aspect of the present invention, there is provided a computer-readable medium comprising computer program code for a controller as specified in claim 17.

According to another aspect of the present invention, there is provided a marine vessel comprising a controller as specified in claim 18.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
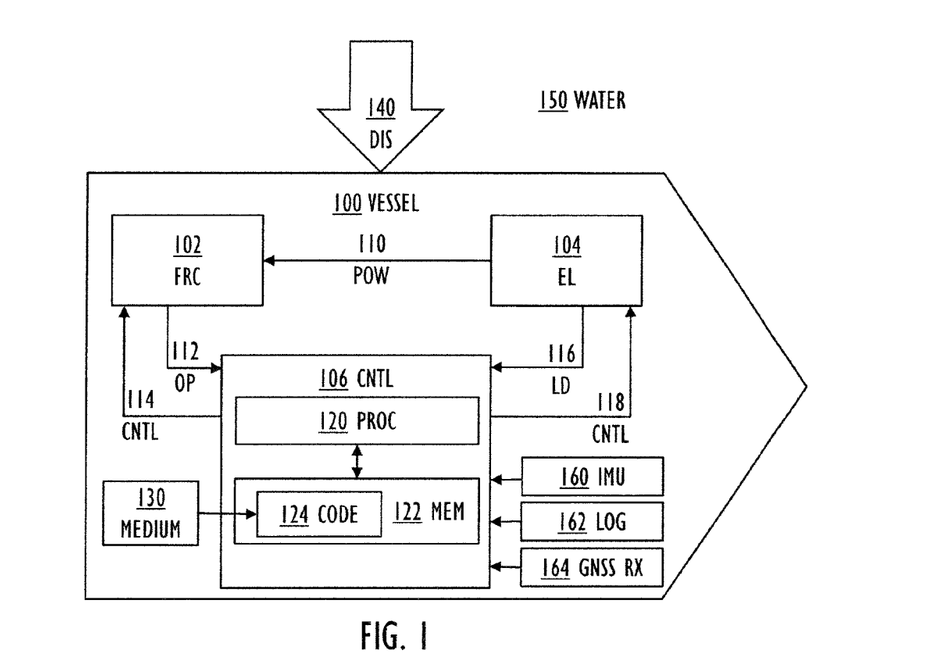
FIG. 1 illustrates example embodiments of a marine vessel.

Let us first study FIG. 1 illustrating example embodiments of a marine vessel 100.

The marine vessel 100 comprises one or more apparatuses 102 exerting force from the marine vessel 100 to ambient water 150, and one or more electric power sources 104 powering the one or more apparatuses 102 exerting force.

Figure 4:
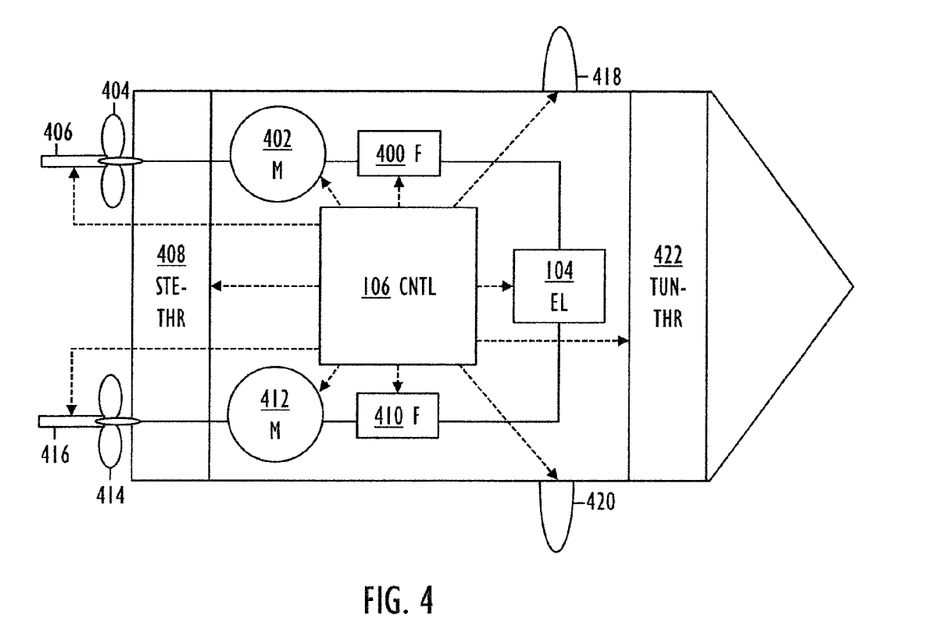
FIGS. 4, 5 and 6 illustrate example embodiments of apparatuses exerting force from the marine vessel to ambient water.
Figure 5:
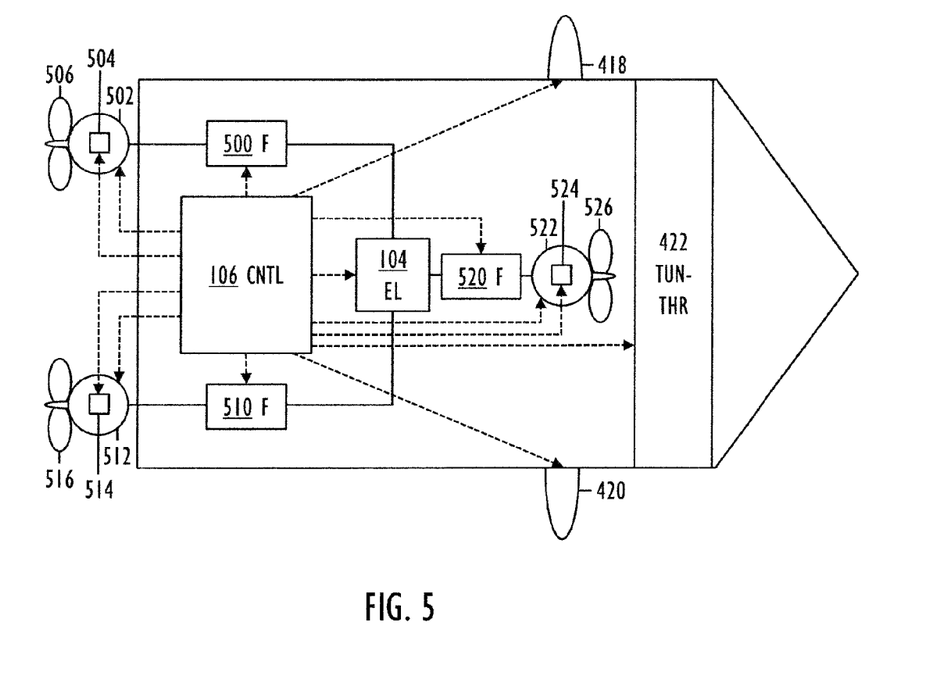
Figure 6:
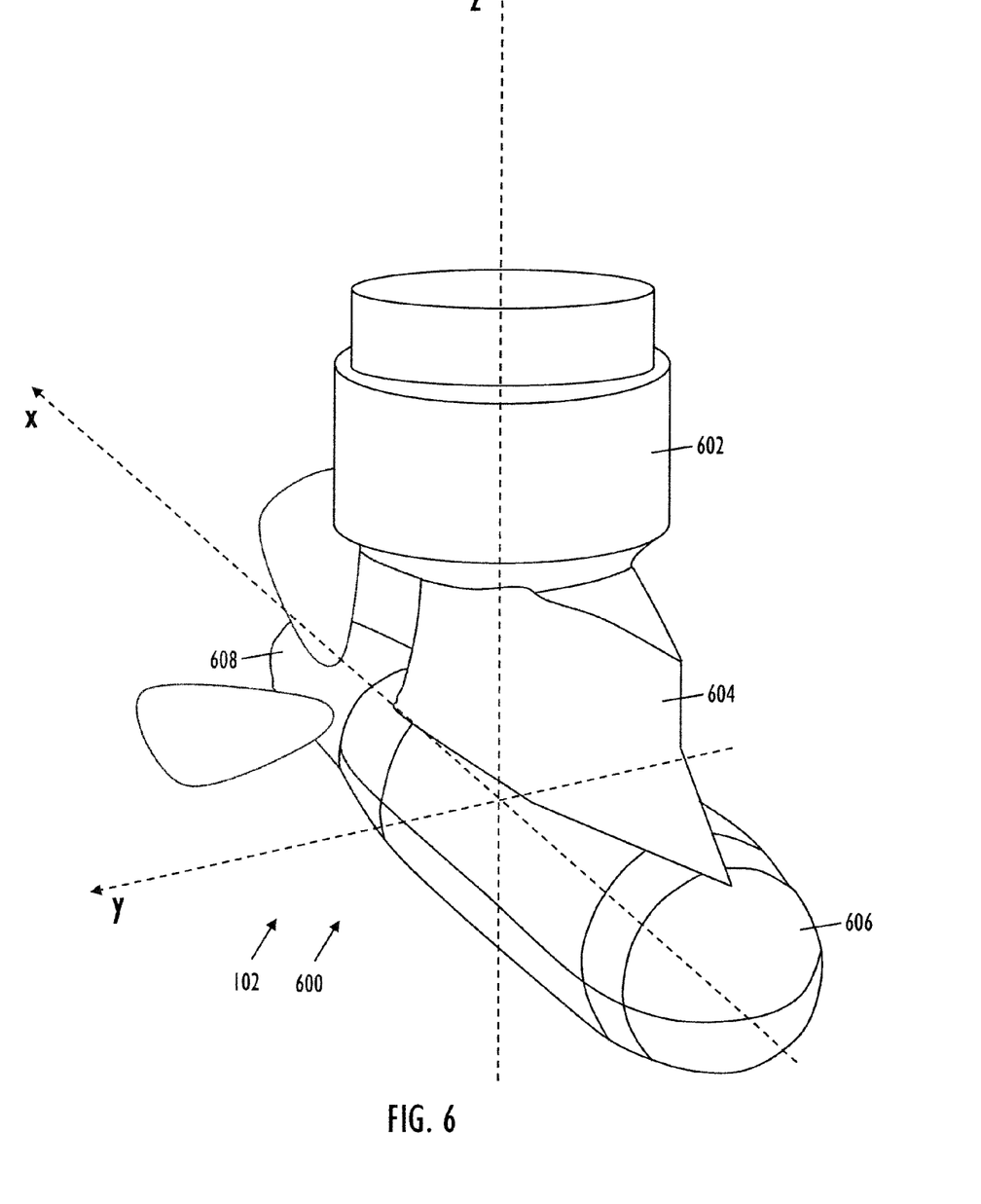

FIGS. 4, 5 and 6 illustrate example embodiments of the apparatuses 102 exerting force from the marine vessel 100 to the ambient water 150.

In FIG. 4, the marine vessel 100 comprises two electric motors 402, 412 coupled via frequency converters 400, 410 with the one or more electric power sources 104. Each motor 402, 412 drives a propeller 404, 414. Furthermore, the propellers 404, 414 interact with rudders 406, 416. The marine vessel 100 may also comprise a stern thruster 408 and/or a tunnel (or bow) thruster 422, which are transversal propulsion devices usually operating with (electrically-powered) propellers (or even with a waterjet thruster). Finally, the marine vessel 100 may also comprise as the one or more apparatuses 102 exerting force active stabilizer fins 418, 420, which emerge laterally from the hull, and their angle of attack may be changed to exert force.

In FIG. 5, the marine vessel 100 comprises two electric podded azimuth thrusters (such as Azipod®), which each have a steerable gondola comprising electric motors 502, 512 coupled via frequency converters 500, 510 with the one or more electric power sources 104, propellers 506, 516, and steering devices 504, 514 (steering the gondolas and their thrust). The marine vessel 100 of FIG. 5 also has a bow-mounted electric podded thruster with similar parts 520, 522, 524, 526. Such marine vessel 100 may also comprise the earlier mentioned tunnel thruster 422 and the active stabilizer fins 418, 420.

FIG. 6 illustrates a podded azimuth thruster 600. The podded azimuth thruster 600 may be rotated full 360 degrees. In some example embodiments, the marine vessel 100 may be provided with two or even more podded azimuth thrusters 600 and/or one or more fixed propulsion units. Typically, podded azimuth thrusters 600 are configured and positioned below the ship hull at the stern of the marine vessel 100. In the case of two podded azimuth thrusters 600, they may be positioned adjacent to each other such that one is on the port side and one on the starboard side of the vessel hull. Often the podded azimuth thruster 600 may be operated both in pulling and pushing operation modes. Typically one of the operation modes is the principal operation mode to be used in open water, the other being applied temporarily in ports, for example.

In an example embodiment, the propulsion power for the podded azimuth thruster 600 is provided by an electric motor arranged into an underwater pod unit 606 exterior to the vessel hull. In another example embodiment, the propulsion power is provided by an engine (diesel or electric) arranged within the vessel hull, wherefrom the power is delivered by gears to a propeller shaft of the podded azimuth thruster 600.

The main parts of the podded azimuth thruster 600 comprise a pod 606 with a propeller 608, a rotating member 602, and a strut 604 coupling the pod 606 with the rotating member 602. By means of the rotating member 602 such as steering bearing or rim the podded azimuth thruster 600 is fixed rotatably to the marine vessel 600. The pod 606 with the propeller 608 and the strut 604 are located in the water 150 under the ship hull, whereas the rotating member 602 and a steering unit controlling the rotation of the rotating member 602 reside mainly within the ship hull.

In the example embodiment of FIG. 6, the podded azimuth thruster 600 comprises the shuttle-formed pod 606 housing an electric motor, i.e., it is an electric podded azimuth thruster as explained with reference to FIG. 5. The shaft of the motor 502, 512 is fixed to the propeller 608, which is fixed either the fore of aft of the pod 606.

Note that FIGS. 4, 5 and 6 only present some example embodiment configurations of the one or more apparatuses 104 exerting force as the marine vessel 100 may also utilize different technologies and/or configurations as well.

The one or more electric power sources 104 may comprise one or more electric generators, and/or one or more electric storages. In this application, 'electric generator' is to understood in its broad meaning: it generates electric power from other sources of energy. Consequently, the electric generator may be a power plant, such as a diesel generator, a nuclear power plant, a fuel cell, a steam generator, a wind generator, a solar generator, etc. As the technology emerges, the electric generators and the electric storages as the one or more electric power sources 104 may apply the emerging technologies.

In an example embodiment, the marine vessel 100 also comprises a controller 106 for the one or more apparatuses 102 exerting force from the marine vessel 100 to the ambient water 150. The controller 106 may operate in a self-sufficient fashion, without requiring near real-time exchange of information with vessel-external servers or a computing cloud. This may improve the control as it becomes faster (=data transmission delays are minimized, and, if the data connections are lost at the high sea, the control is still functioning). In FIGS. 4 and 5, dotted lines extending from the controller 106 describe (input/output) control connections to the one or more apparatuses 102 exerting force and to the one or more electric power sources 104.

In an example embodiment, the controller 106 comprises one or more processors 120, and one or more memories 122 including computer program code 124, which, when loaded into the one or more processors 120 and executed by the one or more processors 120, causes the controller 106 to perform a computer-implemented method for controlling the marine vessel 100, which will be explained with reference to FIG. 3.

An example embodiment provides a computer-readable medium 130 comprising the computer program code 124 for the controller 106, which, when loaded into the controller 106 and executed by the controller 106, causes the controller 106 to perform the computer-implemented method for controlling the marine vessel 100, which will be explained with reference to FIG. 3.

The term 'processor' 120 refers to a device that is capable of processing data. Depending on the processing power needed, the control unit 106 may comprise several processors 120 such as parallel processors or a multicore processor.

The term 'memory' 122 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The processor 120 and the memory 122 may be implemented by an electronic circuitry. A non-exhaustive list of implementation techniques for the processor 120 and the memory 122 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 124 may be implemented by software and/or hardware. In an example embodiment, the software may be written by a suitable programming language (a high-level programming language, such as C, C++, or Java, or a low-level programming language, such as a machine language, or an assembler, for example), and the resulting executable code 124 may be stored on the memory 122 and run by the processor 120. In an alternative example embodiment, the functionality of the hardware may be designed by a suitable hardware description language (such as Verilog or VHDL), and transformed into a gate-level netlist (describing standard cells and the electrical connections between them), and after further phases the chip implementing the processor 120 memory 122 and the code 124 may be fabricated with photo masks describing the circuitry.

In an example embodiment, the operations of the computer program code 124 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 124 for performing a wide variety of standard operations. In an example embodiment, the computer program code 124 may be in source code form, object code form, executable file, or in some intermediate form.

The computer-readable medium 130 may comprise at least the following: any entity or device capable of carrying the computer program code 124 to the controller 106, a record medium, a computer memory, a read-only memory, an electrical carrier signal, a telecommunications signal, and a software distribution medium. In some jurisdictions, depending on the legislation and the patent practice, the computer-readable medium 130 may not be the telecommunications signal. In an example embodiment, the computer-readable medium 130 may be a computer-readable storage medium. In an example embodiment, the computer-readable medium 130 may be a non-transitory computer-readable storage medium.

Figure 3:
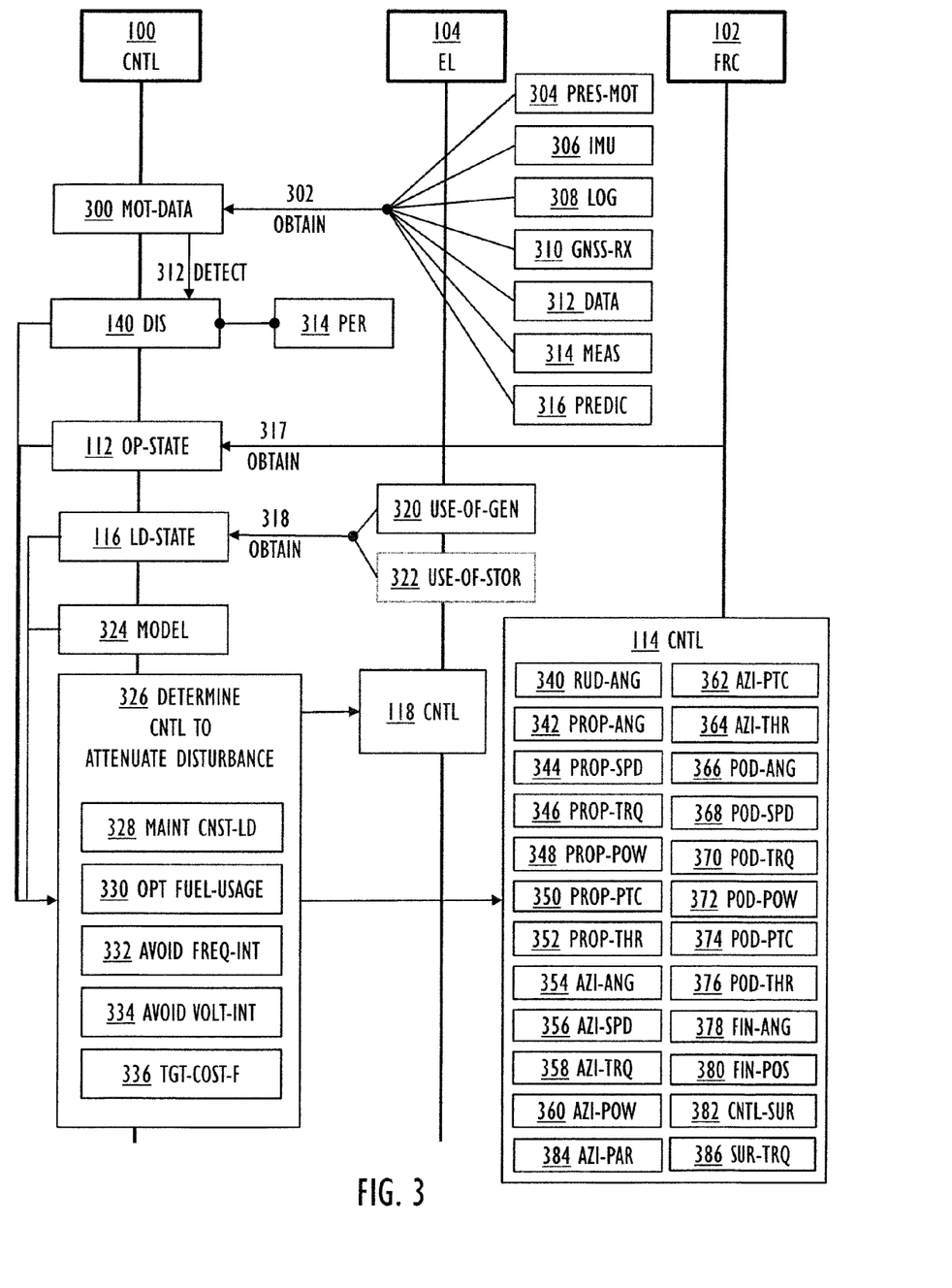
FIG. 3 is a signal sequence chart illustrating example embodiments of a method for controlling a marine vessel.

Next, with reference to FIG. 3 example embodiments of a method for controlling a marine vessel 100 are explained.

The main actors are: the controller 106, the one or more electric power sources 104, and the one or more apparatuses 102 exerting force.

The communication between these actors may be implemented with appropriate wired/wireless communication technologies and standard/proprietary protocols.

In an example embodiment, the wired communication is implemented with a suitable communication technology utilizing coaxial cable, twisted pair or fibre optic such as LAN (Local Area Network) or the Ethernet.

In an example embodiment, the wireless communication is implemented with a suitable radio communication technology such as Bluetooth, Bluetooth Low Energy, Wi-Fi or WLAN (Wireless Local Area Network).

In FIG. 3, the operations are not necessarily in a chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or a part of the operation. It should be noted that no special order of operations is required, except where necessary due to the logical requirements for the processing order.

The method starts in 302, as motion data 300 related to the marine vessel 100 is obtained.

In an example embodiment, the motion data 300 comprises one or more of the following: data 304 describing a present motion of the marine vessel 100, data 306 generated by one or more inertial measurement units 160 of the marine vessel 100, data 308 generated by a sensor fusion-based speedlog 162 of the marine vessel 100, data 310 generated by a satellite positioning receiver 164 (GNSS=Global Navigation Satellite System such as GPS, Glonass, Galileo or Beidou) of the marine vessel 100, data 312 derived from measurements related to the marine vessel 100, measurements 314 related to waves in the ambient water 150, predictions 316 related to waves in the ambient water 150.

The data 304 describing the motion of the marine vessel 100 may include one or more of the following operating points of the marine vessel 100: speed, rate of turn, draft, trim, list, water depth, drift angle, wind speed and direction, sea currents, etc.

The measurements 314 and predictions 316 related to the waves may include wave height, magnitude, period, frequency, direction, etc. Such data 314, 316 may be generated by sensors such as wave radars, navigation radars, microwave radars, camera systems, optical sensors, laser scanners, hydrostatic sensors, buoy sensors, etc., and, in addition, wave predictions from weather forecasts may be utilized.

In an example embodiment, the motion data 300 is defined as generic information, which may be obtained as a combination of a single or several measurements not necessarily related to the motion measurement itself. The motion data 300 may be identifiable as subspace components of a data set comprising one or several measurements.

In 317, an operation state 112 related to the one or more apparatuses 102 exerting force from the marine vessel 100 to the ambient water 150 is obtained.

In an example embodiment, the operation state 112 relates to one or more of the following: a rudder angle 340, a propeller angle 342, a propeller speed 344, a propeller torque 346, a propeller power 348, a propeller pitch 350, a propeller thrust 352, an azimuth thruster angle 354, an azimuth thruster speed 356, an azimuth thruster torque 358, an azimuth thruster power 360, an azimuth thruster pitch 362, an azimuth thruster thrust 364, an electric podded azimuth thruster angle 366, an electric podded azimuth thruster speed 368, an electric podded azimuth thruster torque 370, an electric podded azimuth thruster power 372, an electric podded azimuth thruster pitch 374, an electric podded azimuth thruster thrust 376, a stabilizer fin angle of attack 378, a stabilizer fin position 380, a control surface 382 interacting with the ambient water 150.

In 312, a disturbance 140 in one or more degrees of freedom affecting the marine vessel 100 based on the motion data 300 is detected.

Figure 2:
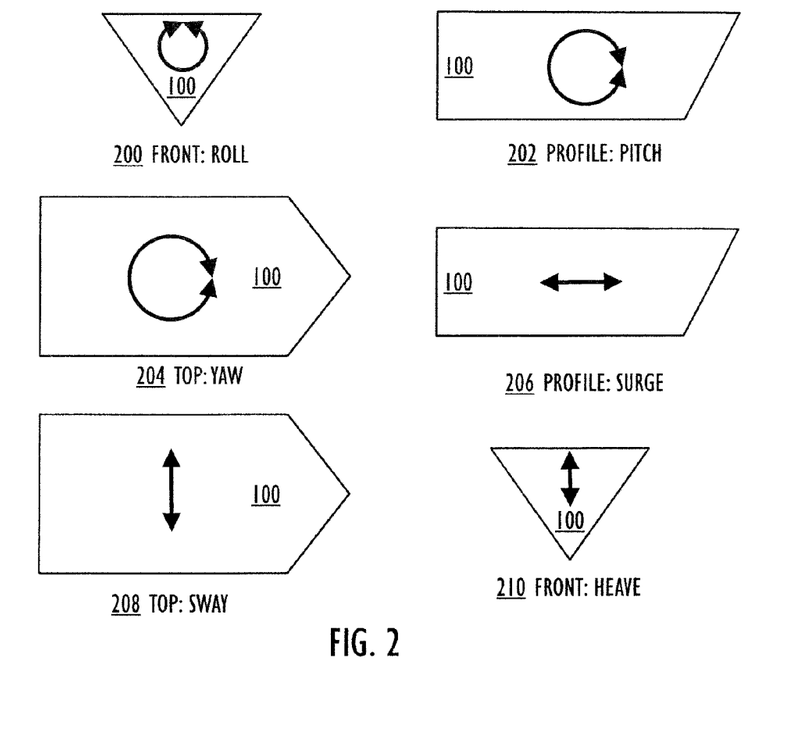
FIG. 2 illustrates motions of the marine vessel.

FIG. 2 illustrates motions of the marine vessel 100 utilizing front, profile and top views of the marine vessel 100: a roll 200, a pitch 202, a yaw 204, a surge 206, a sway 208, and a heave 210.

In an example embodiment, the disturbance 140 in the one or more degrees of freedom comprises one or more of the following: the roll 200, the pitch 202, the yaw 204, the surge 206, the sway 208.

In an example embodiment, the attenuation of the roll 200 and the yaw 204 decreases the use of rudder for an autopilot, and, consequently, reduces drag and fuel consumption of the marine vessel 100.

In an example embodiment, wherein the ratio of the length and width of the marine vessel 100 is small, amplitudes and periods of the roll 200 and the pitch 202 liken each other, whereby their attenuation is especially beneficial. A dynamic positioning (DP) marine vessel 100, i.e., a marine vessel 100 utilizing computer-controlled system to automatically maintain position and heading by using its own apparatuses 102 exerting force, may especially benefit from the described attenuation.

In 326, control data 114 is determined for the one or more apparatuses 102 exerting force to attenuate the detected disturbance 140.

In an example embodiment, the one or more apparatuses 102 exerting force comprises one or more podded azimuth thrusters 600, and the determining 312 of the control data 114 comprises determining one or more of a steering angle, speed, torque, power and thrust 384 for each podded azimuth thruster 600 to attenuate the detected disturbance 140 The steering angle 384 may be regulated by rotating the pod 606 and strut 604. The propulsion speed/torque/power/thrust 384 may be regulated by adjusting rotation speed (RPM) of the propeller 608. Note that the control data 114 may be determine the steering angle and/or the speed/torque/power/thrust for the one or more podded azimuth thrusters 600, and that the operation state 112 may include information of the current steering angle and/or the current speed/torque/power/thrust. This means that the control data 114 may adjust both the steering angle and the speed/torque/power/thrust, or only one of them (and let the other remain in the current setting).

In an example embodiment, the determining 312 of the control data 114 further comprises determining a torque 386 caused by surfaces of a pod 606 and a strut 604 of each podded azimuth thruster 600 to attenuate the detected disturbance 140.

As shown in FIG. 6, the pod 606 and the strut 604 have a considerable surface, which applies torque to the ambient water 150 during the use of the podded azimuth thruster 600, both during a stationary position and also during the turning of the pod 606.

FIG. 6 also illustrates xyz-coordinates of the podded azimuth thruster 600. The pod 606 and the strut 604 are rotatable around the z-axis to change the steering angle. Force vectors are directed along the shown x, y and z axes. Also torques affect around each axis.

In an example embodiment, the determining 326 of the control data 114 is based on a model 324 describing an effect caused by a change in the operation state 112 to a future motion of the marine vessel 100.

In an example embodiment, the model 324 may be created by using well-known methods including physical modelling, Computational Fluid Dynamics (CFD), hydrodynamic modeling, system identification, frequency domain modelling, neural networks, machine learning, artificial intelligence, linear regression, nonlinear regression, least squares, recursive least squares, etc. The model 324 may utilize the previously explained operation states 112 and the motion data 300.

In an example embodiment, the control data 114 controls one or more of the following: the rudder angle 340, the propeller angle 342, the propeller speed 344, the propeller torque 346, the propeller power 348, the propeller pitch 350, a propeller thrust 352, the azimuth thruster angle 354, the azimuth thruster speed 356, the azimuth thruster torque 358, the azimuth thruster power 360, the azimuth thruster pitch 362, the azimuth thruster thrust 364 the electric podded azimuth thruster angle 366, the electric podded azimuth thruster speed 368, the electric podded azimuth thruster torque 370, the electric podded azimuth thruster power 372, the electric podded azimuth thruster pitch 374, the electric podded azimuth thruster thrust 376, the stabilizer fin angle of attack 378, the stabilizer fin position 380, the control surface 382 interacting with the ambient water 150.

In an example embodiment, the method further comprises: obtaining 318 a loading state 116 related to one or more electric power sources 104 powering the one or more apparatuses 102 exerting force; and the determining 326 of the control data 114 comprises optimizing use of electric power by the one or more apparatuses 102 exerting force to minimize an electric load fluctuation for the one or more electric power sources 104 in view of the loading state 116. As shown in FIG. 3, control data 118 may also be determined 326 for the one or more electric power sources 104 to optimize their use.

In an example embodiment, the loading state 116 comprises one or more of the following: a use 320 of the one or more electric generators as the one or more electric power sources 104, a use 322 of the one or more electric storages as the one or more electric power sources 104.

The electric load fluctuation may harm the operation of the marine vessel 100 as the thrust from the one or more apparatuses 102 exerting force may vary causing changes in speed and power consumption. In the configurations of FIGS. 4 and 5, there are basically two power lines: to port 400/402/404/406 or 500/502/504/506, and to starboard 410/412/4014/416 or 510/512/514/516. The control data 114, 118 may be determined so that combined power output of these power lines remains relatively constant, which means that the electric load fluctuation is minimized at the same time. Naturally, the other apparatuses 408, 418, 420 and 422, or 520, 522, 524, 526, 418, 420 and 422, may be taken into account in such load balancing.

In an example embodiment, the control data 118 controls one or more of the following: a use of the one or more electric generators as the one or more electric power sources 104, a use of the one or more electric storages as the one or more electric power sources 104, an avoidance 332, 334 of a frequency interference and/or a voltage interference in the use of the one or more electric power sources 104.

In an example embodiment, the control data 114, 118 is determined in view of maintaining 328 a constant load for one or more electric generators as the one or more electric power sources 104 and/or optimizing 330 a fuel usage for one or more electric generators as the one or more electric power sources 104.

In an example embodiment, the control data 114, 118 is determined to attenuate the disturbance by controlling the two or more apparatuses 102 exerting force so that their combined use of electric power is optimized to avoid 332, 334, 336 a frequency interference and/or a voltage interference related to the one or more electric power sources 104. Besides the electric load fluctuation, the frequency interference and the voltage interference may also harm the operation of the marine vessel 100 as the thrust from the apparatuses 102 exerting force may vary causing changes in speed and power consumption.

In an example embodiment, the control data 114, 118 is determined in view of a target cost function 338 representing used electric power by the one or more apparatuses 102 exerting force. The aim of the target cost function 338 may be to minimize the average running costs of the marine vessel 100.

In an example embodiment, the control data 114, 118 is determined to attenuate a future disturbance as the disturbance predicted with a periodic disturbance pattern detected based on the motion data 300. The periodic disturbance may be caused by waves and/or wind and/or sea currents and/or flow fields. In this way, the disturbances may be attenuated in a planned fashion. The periodic disturbance pattern may be continuously updated based on the motion data 300. The magnitude and direction of environmental forces affecting position of the marine vessel 100 as disturbances are measured and/or predicted. Besides disturbances caused by natural phenomena, an onboard device in the marine vessel 100 may cause a (additional) disturbance, whose impact need to be compensated.

In an example embodiment, the control data 114, 118 is determined to use of the one or more electric power sources 104 in view of the detected periodic disturbance pattern.

The control data 114, 118 may be generated with well-known methods used in the field of active vibration control, including nonlinear optimal control, Linear Quadratic Control (LQC), Linear Quadratic Gaussian (LQG), Model Predictive Control (MPC), Nonlinear Model Predictive Control (NMPC), Convergent Control (CC), etc. Application of such control methods for attenuation of general periodic motions is described in a doctoral dissertation by Juha Orivuori and the references within: Model-Based Optimal Control of Multidimensional and Multi-Tonal Frequency Varying Disturbances, Aalto University publication series, doctoral dissertations November 2013, available at: http://lib.tkk.fi/Diss/2013/isbn9789526049786/isbn9789526049786.pdf In an example embodiment, the control data 114, 118 comprises a multi-input-multi-output (MIMO) periodic control signal, which attenuates the ship motions in a multivariate state vector case.

The described control 326, 114, 118 may decrease the fuel consumption of the marine vessel 100, increase passenger comfort and safety (and cargo stability) on the marine vessel 100, and decrease the stress of the structures and electromechanical parts of the marine vessel 100 thus increasing their lifetime.

The described control achieves smooth motions for the marine vessel 100 by using minimal amount of control effort creating control actions to achieve destructive wave motions to attenuate the (periodic) motions of the marine vessel 100. In practice, the described control achieves a generalized wave motion, which has an opposite phase to the motion caused by the disturbance 140. The opposite phase offers the ideal mitigation against the disturbance 140, but an angle of 90 to 180 degrees against the disturbance 140 offers mitigation.

In an example embodiment, the described control utilizes a vessel model and periodic disturbance models lumped to a vessel dynamic model to come up with an optimal control for MIMO (multi-input multi-output) periodic disturbance attenuation. In an alternative embodiment, the control is realized, instead of a modelbase, with a model free solution, which modifies the control algorithm during use.

There are several novelties using the MIMO approach. The existing solutions utilize the propeller rotation speed only for generating the counter force to attenuate the roll motion. However, this only works in vessels with shaftline fixed speed propulsion vessels. In vessels with azimuthing thrusters controlling the rotation speed only is not enough to generate proper counter force for motion attenuation. At minimum, the azimuth angle needs to be used as an input signal to the model. However, including only the azimuth angle to the model but controlling the force using the rotation speed will not give optimal results, because it is very typical that the azimuthing thrusters also have some rudder surface which will cause disturbances to the motions. Moreover, even in shaftline propulsion systems the motions can be affected by rudders, stabilizer fins and possibly other thrusters. Therefore, it is very beneficial to be able to control two or more apparatuses 102 exerting the force at the same time to minimize the motions.

The ship dynamics is nonlinear and there are cross-couplings between the various degrees-of-freedom. The cross-couplings depend on the operating point such as the surge and sway speed, rate of turn, etc. Especially in low speeds, with larger yaw and pitch motions, controlling only roll will not give good motion attenuation. The periodic motions in the yaw angle may cause additional action in the rudder angles or azimuth angles, which increases the ship motions, drag and fuel consumption. Taking other degrees-of-freedom in addition to rolling into account in generating the control data 114 will results in better attenuation of all motions, which, in turn, will decrease the ship drag and therefore the fuel consumption.

The method ends after the processing of 326 is finished, or, it may be looped back to 302 to repeat the control cycle as many times as necessary (during the use of the marine vessel 100, for example). It is to be noted that the control may be performed during movement of the marine vessel 100, but as well while the marine vessel 100 is stationary. The marine vessel 100 may thus be a ship, but also an offshore vessel (such as a drilling vessel, offshore production vessel etc.), or another type of watercraft to which the described control is applicable.

As was explained, the disturbances 140 have a serious impact on performance and fuel consumption. The dynamic motion of the marine vessel 100 may cause a large disturbance for the propulsion, which affects the advance speed of the propeller as well as the overall efficiency. In addition, the excessive dynamic motion may cause turbulences around the hull and propulsion, and therefore increase the water resistance and decrease the propulsion efficiency. Furthermore, an impact to the vessel hull may cause deformation, which in itself may be either desirable or an unwanted result.

In addition to the decreased vessel hydrodynamic performance, the disturbances cause fluctuation to the propeller rotational speed and the vessel yaw angle and even the steering angles of podded azimuth thrusters or rudders. The fluctuation of the propeller RPM causes a conventional control system to react on that. But, as the disturbance 140 may be periodic and the conventional control system reacts to that in a wrong phase, the existing control may amplify the movements and therefore significantly increase the fuel consumption.

The example embodiments solve a problem of compensation of (periodic) disturbances 140, which cause unnecessary motions for the marine vessel 100 and therefore cause significant increase in fuel consumption. In addition, the disturbances cause also unnecessary control actions to propulsion and steering systems which may even amplify the vessel motions and therefore cause even more serious increase in the fuel consumption. In addition, the unnecessary large control actions due to large vessel movements may cause significant decrease in the lifetime of the propulsion and steering system.

It will be obvious to a person skilled in the art that, as technology advances, the inventive concept can be implemented in various ways. The invention and its embodiments are not limited to the example embodiments described above but may vary within the scope of the claims.

The invention claimed is:

1. A computer-implemented method for controlling a marine vessel, comprising:
obtaining motion data related to the marine vessel;
obtaining an operation state related to one or more apparatuses exerting force from the marine vessel to ambient water;
detecting a disturbance in one or more degrees of freedom affecting the marine vessel based on the motion data; and
determining control data for the one or more apparatuses exerting force to attenuate the detected disturbance;
wherein the one or more apparatuses exerting force comprises one or more podded azimuth thrusters, and the determining of the control data comprises determining one or more of a steering angle, speed, torque, power and thrust for each podded azimuth thruster to attenuate the detected disturbance; and
wherein the determining of the control data further comprises determining a torque caused by surfaces of a pod and a strut of each podded azimuth thruster to attenuate the detected disturbance.

2. The method of claim 1, wherein the determining of the control data is based on a model describing an effect caused by a change in the operation state to a future motion of the marine vessel.

3. The method of claim 1, wherein the motion data comprises one or more of the following: data describing a present motion of the marine vessel, data generated by one or more inertial measurement units of the marine vessel, data generated by a sensor fusion-based speedlog of the marine vessel, data generated by a satellite positioning receiver of the marine vessel, data derived from measurements related to the marine vessel, measurements related to waves in the ambient water, predictions related to waves in the ambient water.

4. The method of claim 1, wherein the disturbance in the one or more degrees of freedom comprises one or more of the following: roll; pitch, yaw, surge, sway.

5. The method of claim 1, wherein the operation state relates to and the control data controls one or more of the following: a rudder angle, a propeller angle, a propeller speed, a propeller torque, a propeller power, a propeller pitch, a propeller thrust, an azimuth thruster angle, an azimuth thruster speed, an azimuth thruster torque, an azimuth thruster power, an azimuth thruster pitch, an azimuth thruster thrust, an electric podded azimuth thruster angle, an electric podded azimuth thruster speed, an electric podded azimuth thruster torque, an electric podded azimuth thruster power, an electric podded azimuth thruster pitch, an electric podded azimuth thruster thrust, a stabilizer fin angle of attach, a stabilizer fin position, a control surface interacting with the ambient water.

6. The method of claim 1, further comprising:
obtaining a loading state related to one or more electric power sources powering the one or more apparatuses exerting force; and the determining of the control data comprises optimizing use of electric power by the one or more apparatuses exerting force to minimize an electric load fluctuation for the one or more electric power sources in view of the loading state.

7. The method of claim 6, wherein the loading state comprises one or more of the following: a use of one or more electric generators as the one or more electric power sources, a use of one or more electric storages as the one or more electric power sources.

8. The method of claim 6, wherein the control data controls one or more of the following: a use of one or more electric generators as the one or more electric power sources, a use of one or more electric storages as the one or more electric power sources, an avoidance of a frequency interference and/or a voltage interference in the use of the one or more electric power sources.

9. The method of claim 6, wherein the control data is determined in view of maintaining a constant load for one or more electric generators as the one or more electric power sources and/or optimizing a fuel usage for one or more electric generators as the one or more electric power sources.

10. The method of claim 6, wherein the control data is determined to attenuate that disturbance by controlling two or more apparatuses exerting force so that their combined use of electric power is optimized to avoid a frequency interference and/or a voltage interference related to the one or more electric power sources.

11. The method of claim 1, wherein the control data is determined in view of a target cost function representing used electric power by the one or more apparatuses exerting force.

12. The method of claim 1, wherein the control data is determined to attenuate a future disturbance as the disturbance predicted with a periodic disturbance pattern detected based on the motion data.

13. The method of claim 12, wherein the control data is determined to use one or more electric power sources powering the one or more apparatuses exerting force in view of the detected periodic disturbance pattern.

14. A controller for one or more apparatuses exerting force from a marine vessel to ambient water, the controller comprising one or more processors, and one or more memories including computer program code, which, when loaded into the one or more processors and executed by the one or more processors, causes the controller to perform:
    obtaining motion data related to the marine vessel;
    obtaining an operation state related to one or more apparatuses exerting force from the marine vessel to ambient water;
    detecting a disturbance in one or more degrees of freedom affecting the same marine vessel based on the motion data; and
    determining control data for the one or more apparatuses exerting force to attenuate the detected disturbance;
    wherein the one or more apparatuses exerting force comprises one or more podded azimuth thrusters, and the determining of the control data comprises determining one or more of a steering angle, speed, torque, power and thrust for each podded azimuth thruster to attenuate the detected disturbance; and
    wherein the determining of the control data further comprises determining a torque caused by surfaces of a pod and a strut of each podded azimuth thruster to attenuate the detected disturbance.

15. A non-transitory computer-readable medium comprising the computer program code for a controller, which, when loaded into the controller and executed by the controller, causes the controller to perform:
    obtaining motion data related to the marine vessel;
    obtaining an operation state related to one or more apparatuses exerting force from the marine vessel to ambient water;
    detecting a disturbance in one or more degrees of freedom affecting the marine vessel based on the motion data; and
    determining control data for the one or more apparatuses exerting force to attenuate the detected disturbance;
    wherein the one or more apparatuses exerting force comprises one or more podded azimuth thrusters, and the determining of the control data comprises determining one or more of a steering angle, speed, torque, power and thrust for each podded azimuth thruster to attenuate the detected disturbance; and
    wherein the determining of the control data further comprises determining a torque caused by surfaces of a pod and a strut of each podded azimuth thruster to attenuate the detected disturbance.

16. The method of claim 7, wherein the control data controls one or more of the following: a use of one or more electric generators as the one or more electric power sources, a use of one or more electric storages as the one or more electric power sources, an avoidance of a frequency interference and/or a voltage interference in the use of the one or more electric power sources.

17. The method of claim 7, wherein the control data is determined in view of maintaining a constant load for one or more electric generators as the one or more electric power sources and/or optimizing a fuel usage for one or more electric generators as the one or more electric power sources.

18. The method of claim 8, wherein the control data is determined in view of maintaining a constant load for one or more electric generators as the one or more electric power sources and/or optimizing a fuel usage for one or more electric generators as the one or more electric power sources.

* * * * *